(12) United States Patent
Shimoda (10) Patent No.: US 6,250,441 B1
(45) Date of Patent: Jun. 26, 2001

(54) VISCOUS SHEAR-TYPE DAMPER

(75) Inventor: Ikuo Shimoda, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 09/246,734

(22) Filed: Feb. 9, 1999

(30) Foreign Application Priority Data

Feb. 17, 1998  (JP) ................................................ 10-051528

(51) Int. Cl.$^7$ ...................................................... F16F 11/00
(52) U.S. Cl. ........................................ 188/322.5; 267/136
(58) Field of Search .............................. 267/136, 140.11; 188/322.5, 266; 52/167.1

(56) References Cited

U.S. PATENT DOCUMENTS

| | | |
|---|---|---|
| 3,986,222 | 10/1976 | Miyazaki et al. . |
| 4,925,409 | * 5/1990 | Johnson ................................. 440/52 |
| 5,014,474 | * 5/1991 | Fyfe et al. .............................. 52/167 |
| 5,233,800 | * 8/1993 | Sasaki et al. ........................ 52/167 R |
| 5,366,193 | * 11/1994 | Lindsay ................................. 248/183 |
| 5,373,920 | * 12/1994 | Valdivia et al. ...................... 188/266 |
| 5,540,549 | * 7/1996 | McGuire ............................... 416/140 |
| 5,816,566 | * 10/1998 | Gau et al. ......................... 267/140.13 |
| 5,855,259 | * 5/1999 | Gau et al. ............................. 188/298 |
| 5,979,618 | * 11/1999 | Sieg et al. ........................ 188/322.19 |
| 5,992,582 | * 11/1999 | Lou et al. ........................... 188/267.1 |

FOREIGN PATENT DOCUMENTS

| | | |
|---|---|---|
| 54-43262 | 12/1979 | (JP) . |
| 54-43263 | 12/1979 | (JP) . |
| 54-43264 | 12/1979 | (JP) . |
| 60-65925 | 4/1985 | (JP) . |

* cited by examiner

Primary Examiner—Robert J. Oberleitner
Assistant Examiner—Xuan Lan Nguyen
(74) Attorney, Agent, or Firm—Nixon & Vanderhye (57) ABSTRACT

A viscous shear-type damper is provided with a casing including an upper cover which is horizontally movable and a container portion having a rectangular parallelepiped-shaped accommodating space which is covered by the upper cover; an engaging block provided in the accommodating space in such a manner as to be suspended from a lower surface of the upper cover; a plurality of movable resistance plates which are arranged horizontally one above another in the accommodating space of the container portion while maintaining fixed intervals therebetween and engaging with the engaging block; a plurality of fixed resistance plates which are arranged horizontally and fixed to the casing and which are each interposed between adjacent ones of the movable resistance plates while maintaining a very small gap therewith; a viscous material filled in the accommodating space of the container portion to fill the gap between adjacent ones of the movable resistance plates and the fixed resistance plates; and rectifying sections respectively disposed at end portions of the fixed resistance plates to allow the viscous material to flow.

3 Claims, 8 Drawing Sheets

VISCOUS SHEAR-TYPE DAMPER

BACKGROUND OF THE INVENTION

1. Field of the Invention

The present invention relates to a damper which is interposed between structures adapted to undergo relative movement and which functions as a stopper for preventing a sudden displacement of the structure. More particularly, the present invention concerns a so-called viscous shear-type damper which makes use of viscous shear occurring between fixed and movable resistance plates which are arranged in parallel with very small gaps therebetween, and are adapted to undergo relative movement via a viscous material filled in the gaps.

2. Description of the Related Art

In Japanese Utility Model Application Publication No. 43262/1979 (hereafter referred to as the prior art), the present assignees earlier proposed a viscous shear-type damper of this type as an "apparatus for causing damping action."

Namely, the apparatus for causing damping action according to the aforementioned prior art is characterized by the following. Fixed resistance plates formed of rectangular thin plates and moving resistance plates or movable resistance plates formed of thin plates whose length is shorter than that of the fixed resistance plates and whose transverse width is wider than that of the fixed resistance plates are arranged alternately with very small gaps therebetween. The moving resistance plates have mutually opposing cutout portions at their transverse end portions, and engaging blocks are engaged in the cutout portions. A viscous material is filled between the resistance plates thus assembled, and the entire assembly is accommodated in a casing. The fixed resistance plates at their longitudinal end portions abut against casing walls, whereas the moving resistance plates engaged by the engaging blocks have spaces with respect to the casing walls in their transverse end portions. The engaging blocks and the casing are respectively fixed to mutually opposing structural members.

As such, the above-described apparatus in accordance with the prior art has the following features:

(1) Fluid pressure does not take place in the apparatus, and leakage of a fluid does not occur, so that it is unnecessary to adopt a hermetically sealed structure for the apparatus.

(2) Since the apparatus does not have fitting and sliding portions similar to those of a piston cylinder-type damper, a high level of processing accuracy is not required.

(3) Even if the engaging blocks have slight inclinations, parallel positional relationships are maintained between the fixed resistance plates and the movable resistance plates, and a factor of resilient instability of the moving resistance plates in the principal moving direction, in particular, is decreased appreciably.

However, in the above-described prior art, bubbling due to entrainment of air occurs in the viscous material during the operation, i.e., during a sudden displacement of the moving resistance plates. At times, there are cases where overflow can occur, making it impossible to allow stable viscous-shear resisting force to be demonstrated sufficiently.

SUMMARY OF THE INVENTION

Accordingly, the present invention has been devised to overcome the above-described problem of the prior art, and its object is to obtain a viscous shear-type damper which makes it possible to obtain the viscous-shear resisting force stably.

Thus, in the present invention, an attempt is made to overcome the above-described drawback by the dissipation of excessive pressure on the basis of the knowledge that the entrainment of air in the viscous material and the overflow thereof in the prior art cause the excessive pressure in the viscous material due to the sudden displacement of the movable resistance plates and the engaging blocks.

The viscous shear-type damper in accordance with the present invention specifically adopts the following arrangement. Namely, in accordance with one aspect of the present invention, there is provided a viscous shear-type damper comprising: a casing including an upper cover which is horizontally movable and a container portion having a rectangular parallelepiped-shaped accommodating space which is covered by the upper cover; an engaging member provided in the accommodating space in such a manner as to be suspended from a lower surface of the upper cover; a plurality of movable resistance plates which are arranged horizontally one above another in the accommodating space of the container portion while maintaining fixed intervals therebetween and engaging with the engaging member; a fixed resistance plate which is arranged horizontally and fixed to the casing and which is interposed between adjacent ones of the movable resistance plates while maintaining a very small gap therewith; a viscous material filled in the accommodating space of the container portion to fill the gap between adjacent ones of the movable resistance plates and the fixed resistance plate; and a rectifying section disposed at an end portion of the fixed resistance plate to allow the viscous material to flow.

In a preferred example in the present invention, each of the rectifying sections is arranged such that partition plates each having a through hole for allowing the viscous material to flow therethrough are arrayed at intervals.

In accordance with another aspect of the present invention, there is provided a viscous shear-type damper comprising: a casing having a rectangular parallelepiped-shaped accommodating space and serving as a container portion; an engaging member provided in the accommodating space of the container portion and including at least a pair of leg portions arranged parallel to wall surfaces of the accommodating space and a beam spanning upper ends of the leg portions; a plurality of movable resistance plates which are arranged horizontally one above another in the accommodating space of the container portion while maintaining fixed intervals therebetween and engaging with the leg portions of the engaging member; a fixed resistance plate which is arranged horizontally and fixed to the casing and which is interposed between adjacent ones of the movable resistance plates while maintaining a very small gap therewith; a viscous material filled in the accommodating space of the container portion to fill the gap between adjacent ones of the movable resistance plates and the fixed resistance plate; and a rectifying section disposed at an end portion of the fixed resistance plate to allow the viscous material to flow.

In the viscous shear-type damper of the present invention, with respect to the slow displacement of an upper structure accompanying a temperature change, its displacement moves the engaging member through the upper cover, and further displaces the movable resistance plates engaged with the engaging member. In this case, the movement of the movable resistance plates is slow, the viscous-shear resisting force does not occur between the movable resistance plate and the fixed resistance plate, and this displacement is allowed.

With respect to a sudden displacement of the upper structure accompanying an earthquake, its displacement suddenly moves the movable resistance plates through the upper cover and the engaging member, and causes the movable resistance plates to undergo large relative movement with respect to the fixed resistance plate. Due to this relative displacement, the viscous-shear resisting force occurs in a relevant portion of the viscous material interposed between both resistance plates. This viscous-shear resisting force constitutes a large resisting force against the sudden displacement during earthquake motion. The earthquake motion is periodical, and the aforementioned viscous-shear resisting force accompanying the same acts alternately in mutually opposite directions, with the result that a high damping characteristic is exhibited and the vibration of the upper structure is absorbed quickly.

In this operation, the rectifying section of the present invention performs the following operation.

Due to the sudden movement of the engaging blocks and the movable resistance plates, the viscous material is subjected to extruding action by the engaging member and the movable resistance plates, and the viscous material itself tends to become fluidized. However, the built-up pressure accompanying the fluidization of the viscous material is led to the rectifying section provided at an end portion of the fixed resistance plate. At the same time, since spaces contiguous to opposite ends of the rectifying section communicate with each other through the rectifying section, the pressure becomes uniform without being offset one-sidedly, and the buildup of the pressure in the viscous material is reduced. As a result, the turbulence of the viscous material is suppressed, the entrainment of air into the viscous material is prevented, and the expected viscous-shear resisting force is exhibited between the two surfaces of the fixed resistance plate and the movable resistance plate. Accordingly, the overflow of the viscous material does not occur.

Since the viscous shear-type damper in accordance with the present invention demonstrates its operation through the above-described arrangement, the buildup of the pressure in the viscous material accompanying the sudden displacement of the engaging member and the movable resistance plates is reduced by the rectifying section, and the turbulence in the viscous material and the entrainment of air are prevented. Consequently, stable viscous-shear resisting force is exhibited between the fixed resistance plate and the movable resistance plate, and the overflow of the viscous material does not occur.

DESCRIPTION OF THE PREFERRED EMBODIMENTS

Referring now to the accompanying drawings, a description will be given of embodiments of the viscous shear-type damper in accordance with the present invention.

First Embodiment

Figure 1:
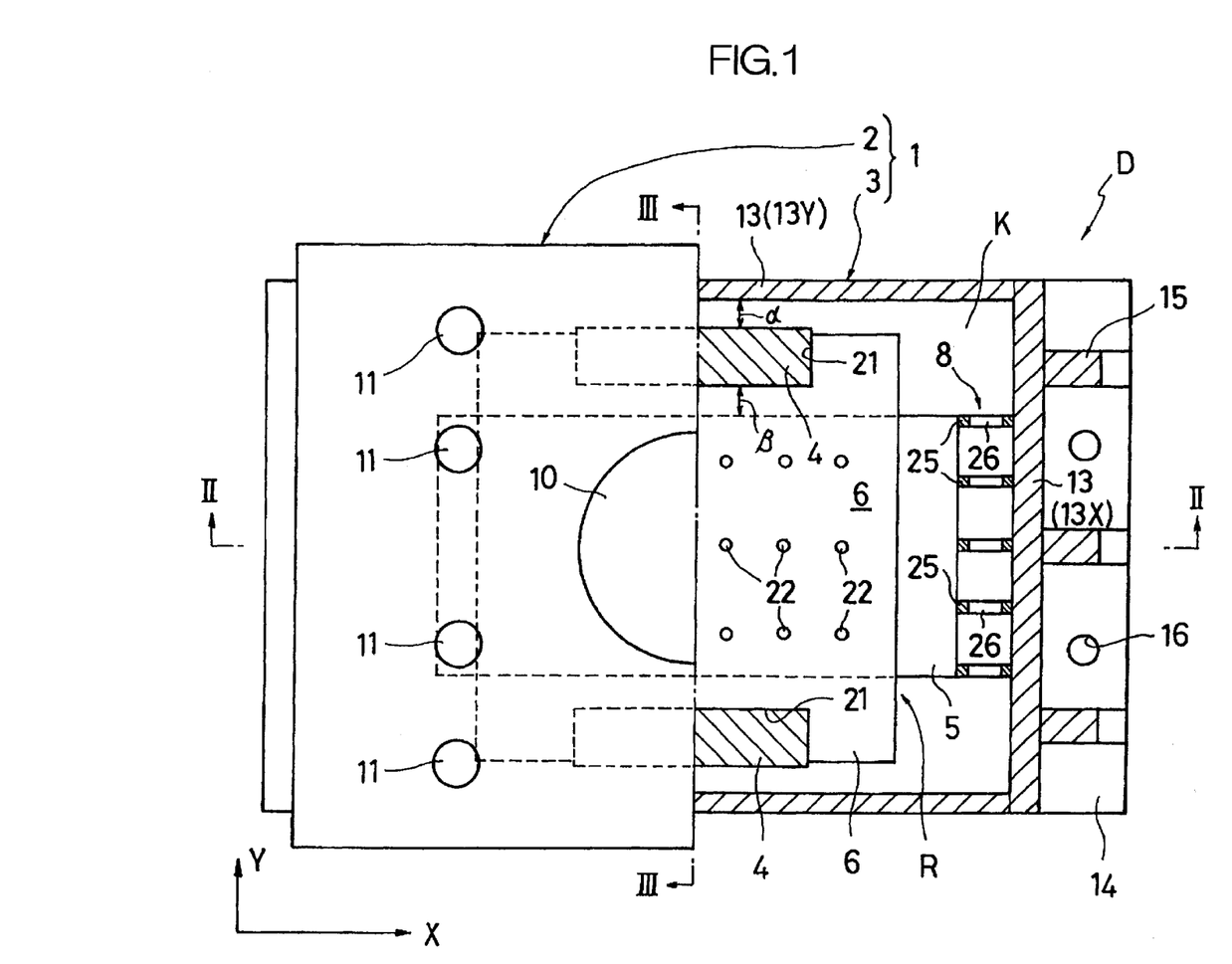
FIG. 1 is a plan view, partly in section, illustrating an overall structure of a viscous shear-type damper in accordance with an embodiment of the present invention (a partly cross-sectional view taken along line I—I of FIG. 2)
Figure 2:
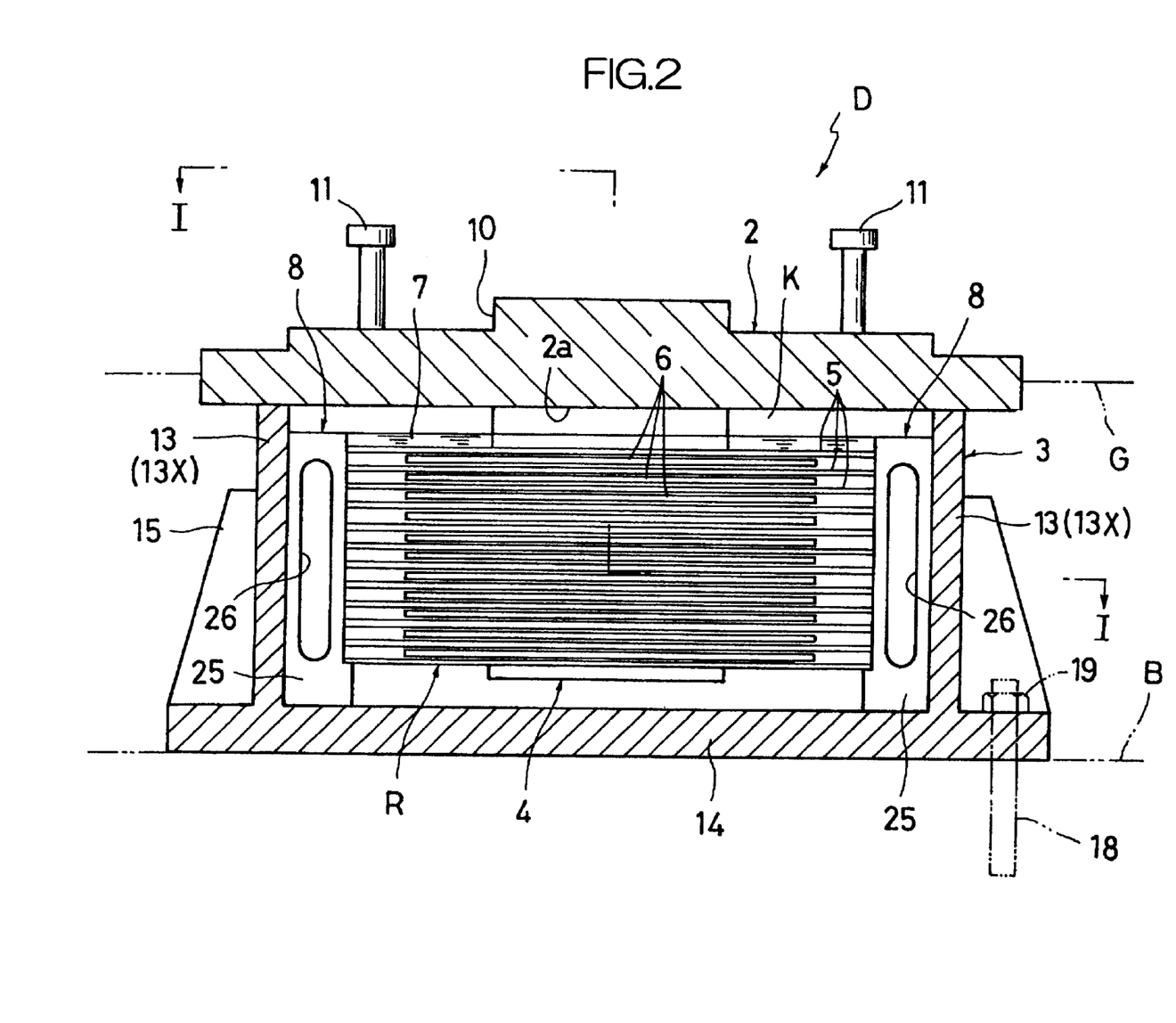
FIG. 2 is a cross-sectional view taken along line II—II of FIG. 1.
Figure 3:
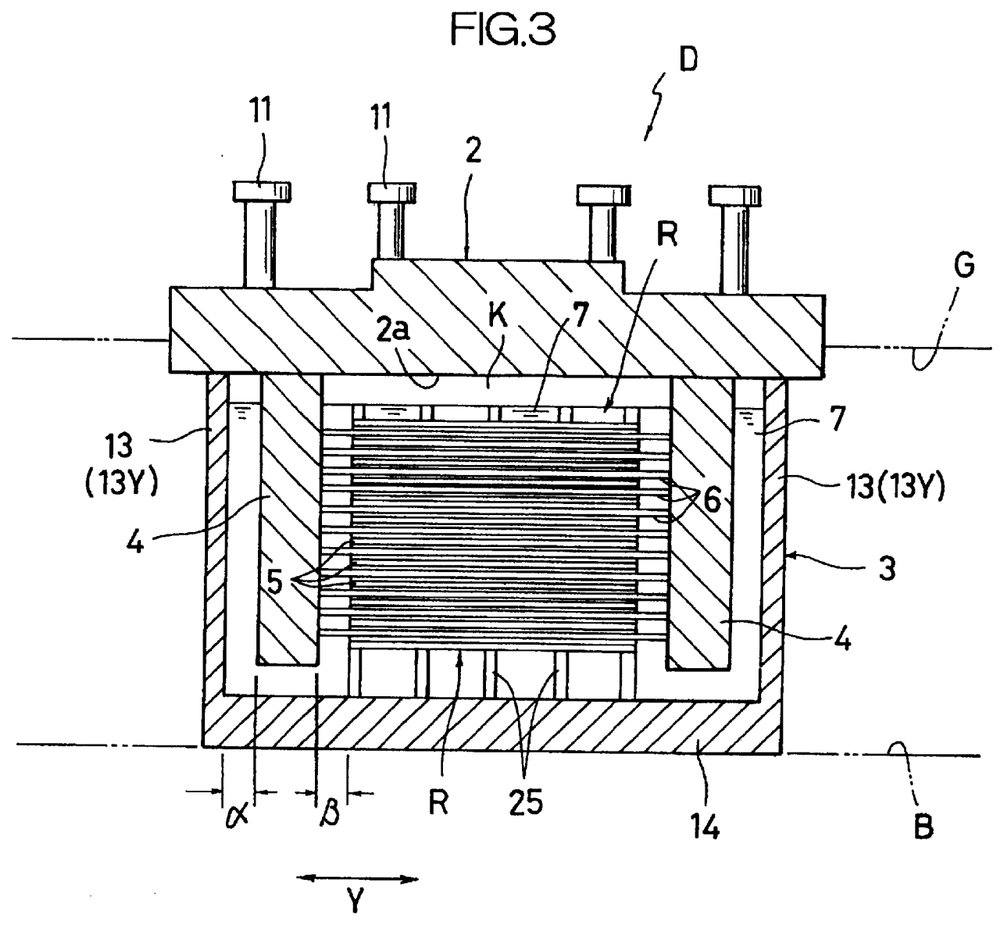
FIG. 3 is a cross-sectional view taken along line III—III of FIG. 1.
Figure 4:
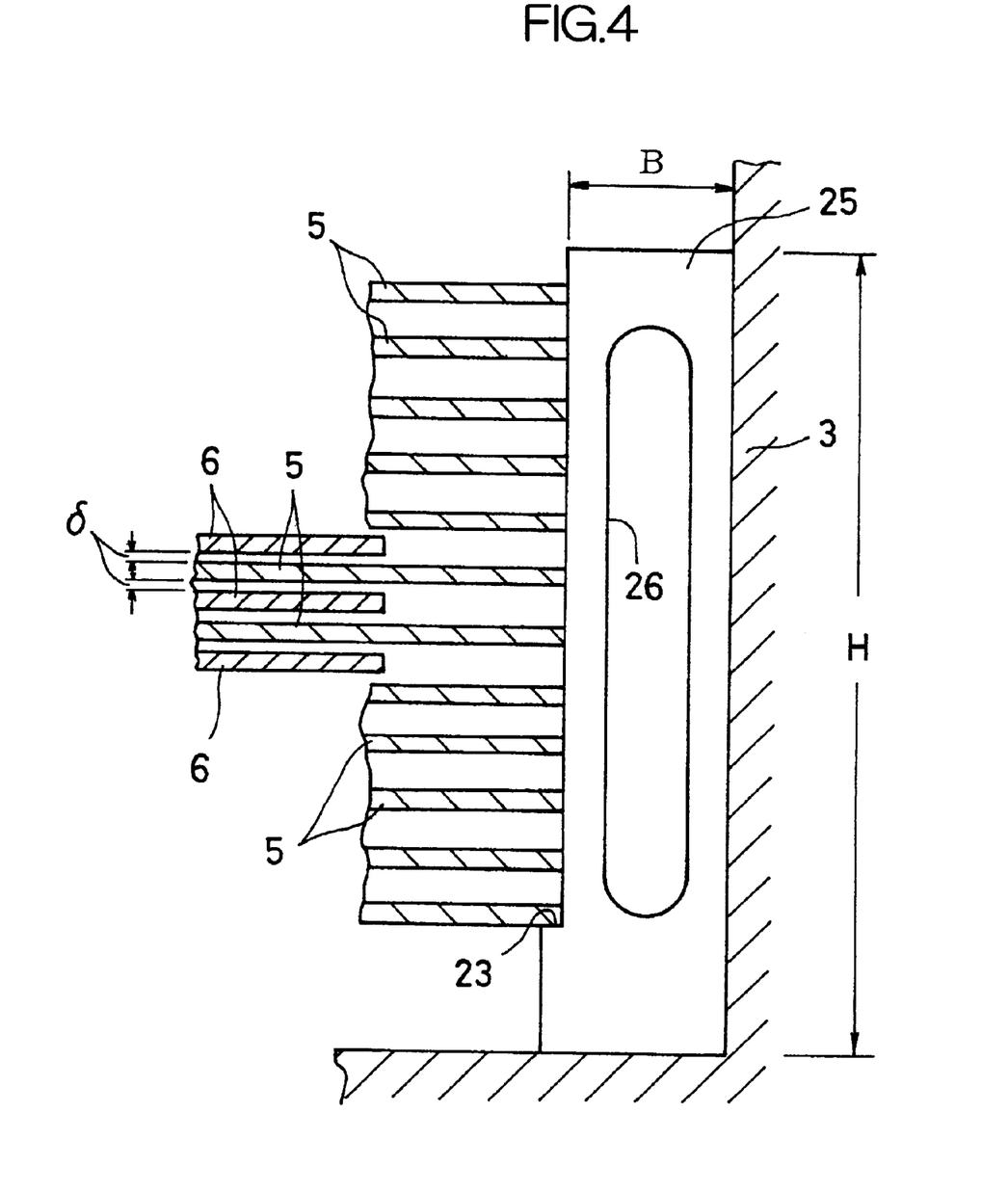
FIG. 4 is an enlarged side view of a rectifying section which is an essential portion.

FIGS. 1 to 4 show a viscous shear-type damper D in accordance with a first embodiment of the present invention, which adopts a unidirectionally moving type and a hermetically sealed type. Namely, FIGS. 1 to 3 illustrate an overall configuration thereof, and FIG. 4 illustrates a partial configuration thereof. It should be noted that, in the drawings, X indicates a principal direction of movement, while Y indicates a planar direction perpendicular to X.

The viscous shear-type damper D in this embodiment includes a casing 1 consisting of an upper cover 2 and a container portion 3; a pair of engaging blocks 4 suspended from the lower surface of the upper cover 2 at symmetrical positions and serving as engaging members; a plurality of fixed resistance plates 5 and movable resistance plates 6 which are arranged alternately in the accommodating space of the container portion 3 with predetermined gaps therebetween; a viscous material 7 filled in the accommodating space of the container portion 3; and a pair of rectifying sections 8 disposed at both end portions of the fixed resistance plates 5.

A viscous-shear-resistance generating section R is formed by the fixed resistance plates 5 and the movable resistance plates 6 in the accommodating space of the aforementioned container portion 3 as well as the viscous material 7 filled between the resistance plates 5 and 6.

This viscous shear-type damper D is interposed between an upper structure G and a lower structure B.

Hereafter, a description will be given of the detailed construction of the various parts.

Casing 1:

The casing 1 consists of the upper cover 2 having a substantially flat shape and the container portion 3 having an accommodating space K therein, and the upper cover 2 slidably covers the upper end face of the opening portion of the container portion 3.

More specifically, the upper cover 2 has an expanse for covering the opening of the container portion 3 with leeway in its sliding range, and its lower surface 2a is finished smoothly. Further, a circular dowel 10 is provided on its upper surface in such a manner as to project from its center, and a plurality of anchor bolts 11 are embedded in the upper surface. Both the dowel 10 and the anchor bolts 11 are used to be fixed to the upper structure G, and may be replaced by other appropriate fixing means.

The container portion 3 is formed by side wall portions 13 and a bottom plate portion 14 and has a box shape which is open in its upper portion, while its interior forms the accommodating space K which is a rectangular parallelepiped. The side wall portions 13 include a pair of side wall portions 13X opposing each other in the X-axis direction and a pair of opposing side wall portions 13Y extending in the X-axis direction. Reinforcing ribs 15 are formed integrally on outer surfaces of the container portion 3, but these reinforcing ribs 15 can be omitted, as necessary. Anchor inserting holes 16 are formed on the outer side of the bottom plate portion 14, anchor bolts 18 (indicated by two-dotted dash lines) embedded in the lower structure B are inserted therethrough, and nuts 19 (indicated by two-dotted dash lines) are threadedly engaged thereon to effect fixation. Incidentally, in a case where the container portion 3 is embedded in concrete, these anchor inserting holes 16, anchor bolts 18, and nuts 19 can be omitted.

Engaging Blocks 4:

The pair of engaging blocks 4 are respectively suspended from the lower surface of the upper cover 2. Each engaging block 4 has a predetermined width, length, and height, and is substantially a rectangular parallelepiped. The two engaging blocks 4 are disposed at symmetrical positions with a predetermined interval therebetween. Further, each engaging block 4, when disposed at a predetermined position, is located at a fixed interval $\alpha$ from the wall surface of the side wall portion 13Y of the container portion 3. The engaging blocks 4 are arranged to be formed integrally with the upper cover 2, and fixing means such as welding or attaching bolts is adopted appropriately to fix the engaging blocks 4 to the upper cover 2. In the case where the attaching bolts are used, the upper cover 2 is removable, so that it is convenient.

Viscous-Shear-Resistance Generating Section R:

The fixed resistance plates 5 and the movable resistance plates 6 are arranged alternately in a vertically overlapping manner with very small fixed intervals $\delta$ therebetween, and constitute the viscous-shear-resistance generating section R together with the viscous material 7 filled in the gaps.

Fixed Resistance Plates 5 and Movable Resistance Plates 6:

The fixed resistance plates 5 have a rectangular shape elongated in the X-direction, and are formed of thin plates with smooth surfaces, and are clamped and fixed by the rectifying sections 8 (which will be described later) at their both ends in the X-direction.

The movable resistance plates 6 are formed of thin rectangular plates with smooth surfaces, their X-direction length is shorter than that of the fixed resistance plates 5, and rectangular recessed portions 21 are formed at their both ends in the Y-direction. The recessed portions 21 are loosely fitted in the engaging blocks 4.

The fixed resistance plates 5 and the movable resistance plates 6 are fabricated from steel plates, but another material may be used insofar as it is a rigid material. As described above, the fixed resistance plates 5 and the movable resistance plates 6 are arranged alternately in a vertically overlapping manner with very small fixed intervals $\delta$ therebetween. Spacers 22 are normally disposed between each fixed resistance plate 5 and each movable resistance plate 6 to maintain this very small interval $\delta$, but if the resistance plates 5 and 6 are small and lightweight, the spacers may be omitted. Alternatively, it is possible to adopt an arrangement in which the predetermined intervals are maintained by means of spacers (not shown) provided at both end portions in the X-direction of the fixed resistance plates 5.

In this arrangement, the lowermost fixed resistance plate 5 is mounted on stepped portions 23 of the rectifying sections 8 which will be described later, the lowermost movable resistance plate 6 is then mounted thereon, and subsequently the fixed resistance plates 5 and the movable resistance plates 6 are alternately arranged upwardly. At this time, the phases of the movable resistance plates 6 are aligned with each other, and the phases of the recessed portions 21 are aligned with each other vertically.

The engaging blocks 4 attached to the lower surface of the upper cover 2 fit into the recessed portions 21 of the movable resistance plates 6. When in a neutral position, the inner surface of each engaging block 4 and the end face of each fixed resistance plate 5 maintains a fixed interval $\beta$ therebetween. Generally, this interval $\beta$ is set to be equal to or greater than the aforementioned distance $\alpha$ between the engaging block 4 and the wall surface.

Viscous Material 7:

As the viscous material 7, a high-viscosity material such as polyolefin or polysiloxane is used, but it is possible to use other material insofar as it exhibits expected viscous shear resistance.

Rectifying Sections 8:

The rectifying sections 8 are respectively disposed at both end portions in the X-direction of the interior of the accommodating space K within the container portion 3 of the casing 1. Specifically, the rectifying sections 8 are arranged such that a predetermined number of (at least two; in this embodiment, five) partition plates 25 are arrayed at each end portion at intervals in such a manner as to extend vertically. The partition plate 25 has a predetermined width, thickness, and height, and a single vertically elongated through hole 26 is formed in a substantially central portion thereof. These partition plates 25 are secured to the inner wall surface of the side wall portion 13 and the bottom plate portion 14 of the container portion 3. The width B of the partition plates 25 determines the length of the fixed resistance plates 5.

As such, the rectifying sections 8 formed by these partition plates 25 primarily contribute to the stabilization of the movement of the movable resistance plates 6 as will be described later, and secondarily holds the mounting position of the fixed resistance plates 5.

Referring to FIG. 4, a further description will be given of the detailed structure of the partition plates 25.

Each of the partition plates 25 has a substantially rectangular shape with the width B, but adopts a wide shape at its lower portion through the stepped portion 23. The aforementioned lowermost fixed resistance plate 5 is mounted on the stepped portions 23. In addition, the height H of the partition plate 25 is determined such that its bottom abuts against the bottom surface of the container portion 3, while its upper portion projects upward from the uppermost fixed resistance plate 5 with leeway in length.

The through hole 26 provided in each partition plate 25 is formed in a substantially oval shape in this embodiment, and one through hole is provided at one location. However, one or more rectangular, circular, or lozenge-shaped through holes may be provided. In short, each through hole is determined so as to make the movement of the viscous material 7 smooth.

As for the securing of the partition plates 25 to the container portion 3, the partition plates 25 are normally secured by welding, but the fitting of the partition plates 25 in grooves formed in inner wall surfaces of the side wall portions 13 is another possible means.

The rectifying sections 8 are not necessarily limited to those described in this embodiment, and may adopt another form insofar as the aforementioned primary and secondary functions can be attained.

Figure 5:
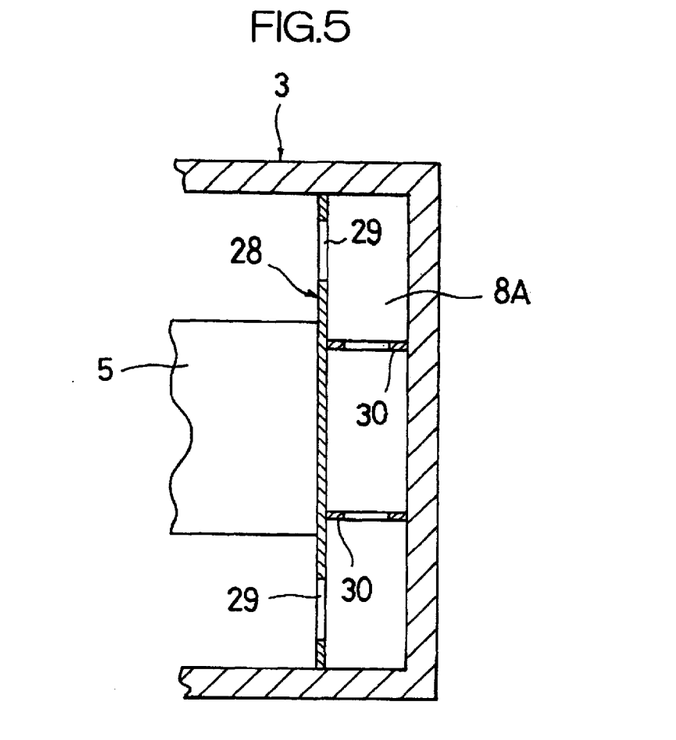
FIG. 5 is a diagram illustrating another example of the rectifying section.
Figure 6:
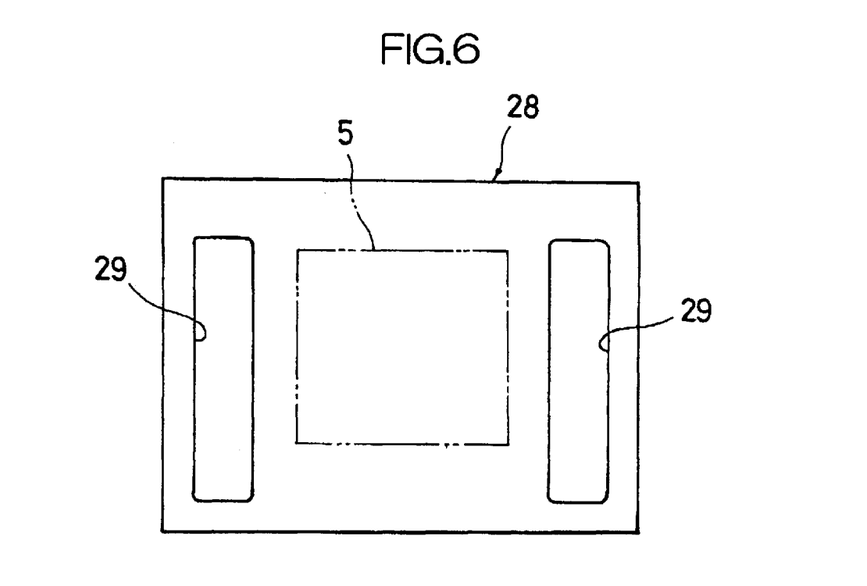
FIG. 6 is a diagram illustrating a structural component of the rectifying section shown in FIG. 5.

FIGS. 5 and 6 show such an example. Namely, a large partition plate 28 is provided at each end portion of the accommodating space K of the container portion 3 in such a manner as to extend between the pair of side wall portions 13Y of the container portion 3. A pair of through holes 29 are respectively formed on both sides of the large partition plate 28, and the fixed resistance plates 5 are secured to these large partition plates 28. Vertical plates 30 are appropriately interposed between the large partition plate 28 and the side wall portion 13X of the container portion 3 so as to reinforce the large partition plate 28. It goes without saying that through holes are provided in the vertical plates 30.

Mode of Installation:

This viscous shear-type damper D is interposed between the upper structure G and the lower structure B, but does not have the function of supporting the load of the upper structure G and performs interfering action in accordance with various forms of the action of the upper structure G.

The viscous shear-type damper D is installed at a location where the displacement of the upper structure G appears, and the upper cover 2 is fixed to the upper structure G by means of the dowel 10 and the anchor bolts 11, while the container portion 3 is fixed to the lower structure B by means of the anchor members. Various forms can be adopted in this fixed installation, and this embodiment is an illustrated example thereof. For example, in a case where steel members are exposed at the upper structure G, neither the dowel 10 nor the anchor bolts 11 are required, the upper cover 2 can be fixed to the steel members by means of welding. Furthermore, it is possible to adopt a form in which the container portion 3 is embedded directly in concrete.

In the case of a bridge, this viscous shear-type damper D is installed on a bridge pier between a girder and the pier such that the direction of its principal movement agrees with the axial direction of the bridge. In addition, in a building or facility having a large space, such as a gymnasium or stadium, a large roof is movably mounted on a building frame, and these viscous shear-type dampers D are installed between the large roof and the upper surface of the building frame. In the case of such a building or facility, displacement in a planar direction, i.e., displacement in the X- and Y-directions, appears.

Operation of This Embodiment:

The viscous shear-type damper D in accordance with this embodiment operates as follows.

With respect to the slow displacement of the upper structure G accompanying a temperature change, its displacement moves the engaging blocks 4 through the upper cover 2, and further displaces the movable resistance plates 6 engaged with the engaging blocks 4 through the recessed portions 21. In this case, the movement of the movable resistance plates 6 is slow, the viscous-shear resisting force does not occur between the movable resistance plate 6 and the fixed resistance plate 5, and this displacement is allowed.

With respect to a sudden displacement of the upper structure G accompanying an earthquake, its displacement suddenly moves the movable resistance plates 6 through the upper cover 2 and the engaging blocks 4, and causes the movable resistance plates 6 to undergo large relative movement with respect to the fixed resistance plates 5. In the case of a bridge, this displacement conspicuously occurs in the axial direction of the bridge, and the X-axis of this damper D is made to agree with the axial direction of the bridge. Due to this relative displacement, the viscous-shear resisting force occurs in a relevant portion of the viscous material 7 interposed between the resistance plates 5 and 6. This viscous-shear resisting force is inversely proportional to the distance between the two surfaces and is proportional to the square of the velocity. In this damper D, a very small gap is adopted as this distance between the two surfaces, and produces a large resisting force with respect to a sudden displacement during earthquake motion. The earthquake motion is periodical, and the aforementioned viscous-shear resisting force accompanying the same acts alternately in mutually opposite directions, with the result that the vibration of the upper structure G is absorbed quickly with a high damping characteristic.

In this operation, the rectifying sections 8 perform the following operation.

Due to the sudden movement of the engaging blocks 4 and the movable resistance plates 6 in the X-direction, the viscous material 7 is subjected to extruding action by the end faces of the engaging blocks 4 and the movable resistance plates 6, the viscous material 7 itself becomes fluidized, and the viscous material 7 undergoes a turbulent flow, possibly resulting in the entrainment of air into the viscous material 7. Consequently, the viscous-shear resisting force between the fixed resistance plate 5 and the movable resistance plate 6 becomes unstable. Furthermore, the overflow of the viscous material 7 can take place.

Since the rectifying sections 8 are provided at the end portions of the fixed resistance plates 5, even if the aforementioned fluidization of the viscous material 7 occurs, the built-up pressure is led to the rectifying sections 8. At the same time, since the rectifying sections 8 are in a communicating state, the pressure becomes uniform without being offset one-sidedly, and the buildup of the pressure in the viscous material 7 is reduced. Concurrently, the turbulence of the viscous material 7 is suppressed. In consequence, the entrainment of air into the viscous material 7 is prevented, and the expected viscous-shear resisting force is exhibited between the two surfaces of the fixed resistance plate 5 and the movable resistance plate 6. Accordingly, the overflow of the viscous material 7 does not occur.

Next, when a displacement component which moves in a direction (in the Y-direction) perpendicular to the principal direction of displacement (X-direction) by deviating from the principal direction of displacement is present in the displacement of the movable resistance plates 6, or when the movable resistance plates 6 move directly in the Y-direction, the turbulence in the viscous material 7 and the entrainment of air occur in the same way as described above due mainly to the flow resistance at the side surfaces of the engaging blocks 4. In this case, the built-up pressure occurring in front of the side surfaces of the engaging blocks 4 is led to the rectifying sections 8 on both sides, and since the rectifying sections 8 are in a communicating state, the buildup of the pressure is quickly dissipated.

In consequence, the entrainment of air into the viscous material 7 is prevented, and the expected viscous-shear resisting force is exhibited between the two surfaces of the fixed resistance plate 5 and the movable resistance plate 6. Accordingly, the overflow of the viscous material 7 does not occur.

In accordance with the viscous shear-type damper D in this embodiment having the above-described arrangement, the buildup of pressure in the viscous material 7 accompanying the sudden displacement of the engaging blocks 4 and the movable resistance plates 6 is reduced by the rectifying sections 8, and the turbulence in the viscous material 7 and the entrainment of air are prevented. As a result, stable viscous-shear resisting force is exhibited between the fixed resistance plate 5 and the movable resistance plate 6, and the overflow of the viscous material 7 does not occur.

Second Embodiment

Figure 7:
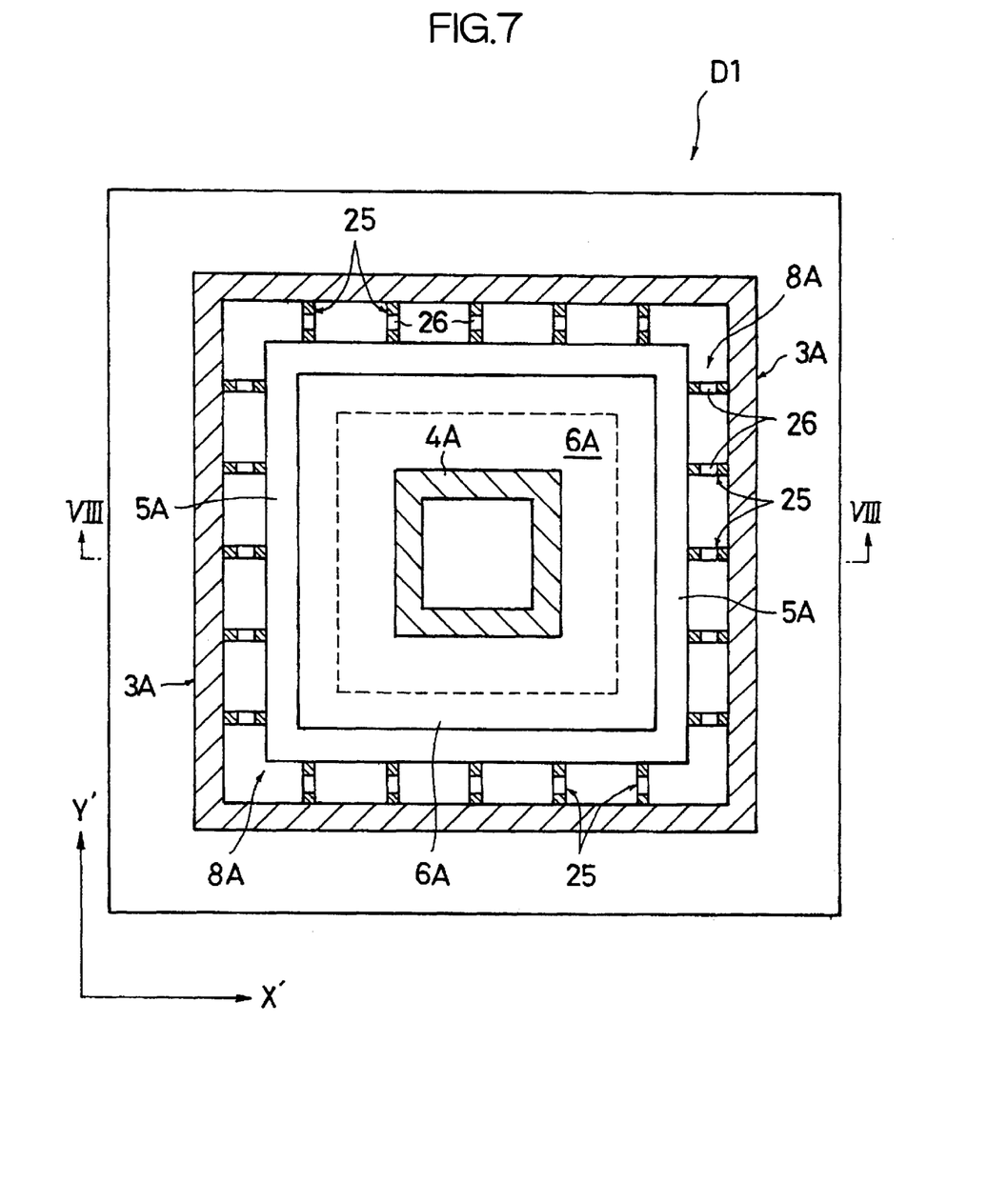
FIG. 7 is a horizontal cross-sectional view illustrating an overall structure of a viscous shear-type damper in accordance with another embodiment of the present invention (a cross-sectional view taken along line VII—VII of FIG. 8)
Figure 8:
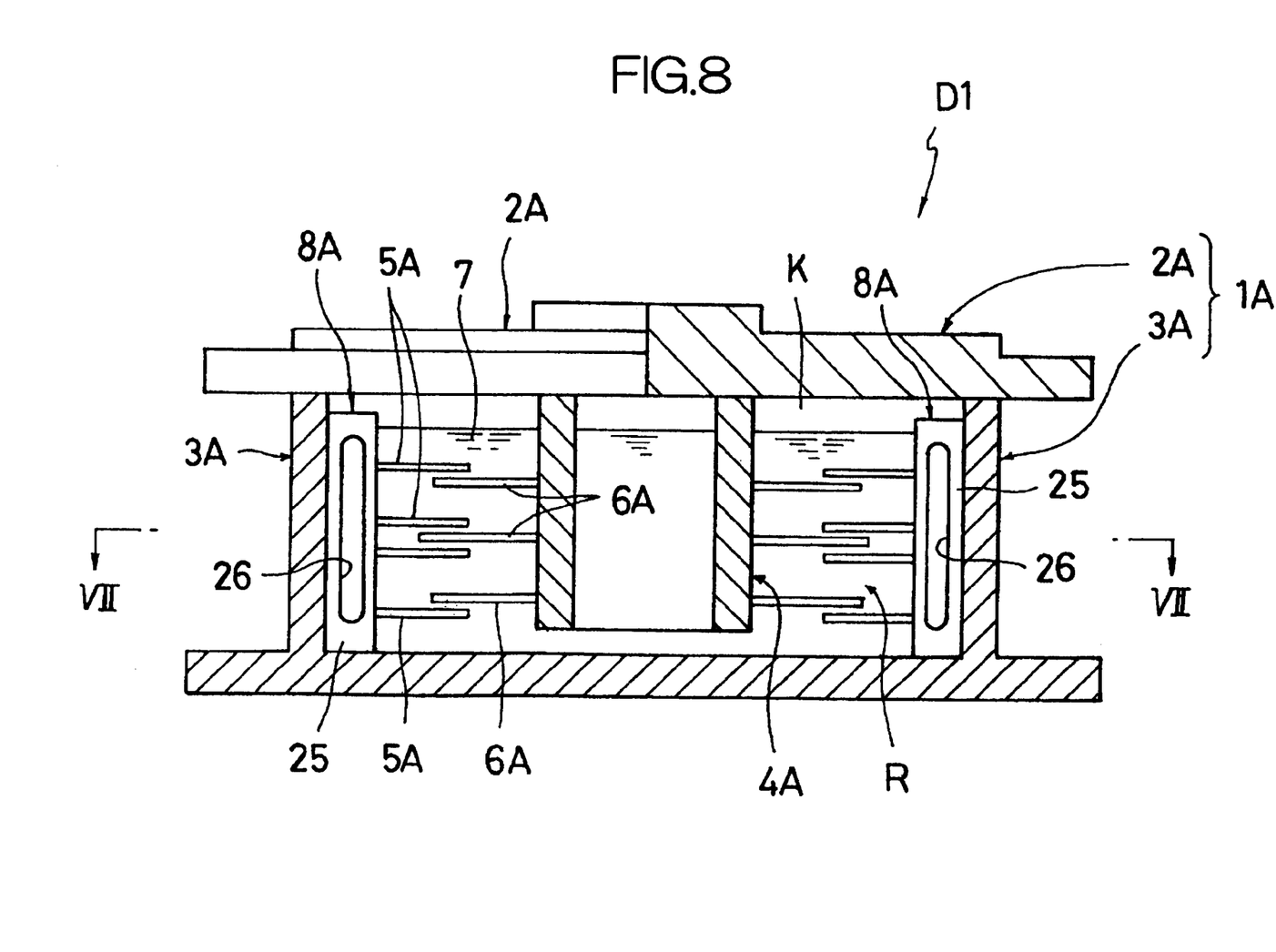
FIG. 8 is a cross-sectional view taken along line VIII—VIII of FIG. 7.

FIGS. 7 and 8 show a viscous shear-type damper D1 in accordance with another embodiment (second embodiment) of the present invention. In this embodiment, the viscous shear-type damper D1 adopts a planarly omnidirectionally moving type and a hermetically sealed type. In these drawings, members equivalent to those of the above-described first embodiment are denoted by the same reference numerals. In addition, X'- and Y'-axes indicate directions which are perpendicular to each other in a plane, and both are principal directions of movement.

In this viscous shear-type damper D1, a casing 1A consists of an upper cover 2A and a container portion 3A both having square horizontal cross sections, and an engaging block 4A serving as a engaging member having the shape of a quadrangular prism is provided inside the accommodating space K of the container portion 3A in such a manner as to be suspended from the center of the lower surface of the upper cover 2A. A plurality of square fixed resistance plates 5A are fixed in the container portion 3A with rectifying sections 8A provided therebetween, and each of a plurality of movable resistance plates 6A engaging with the engaging block 4A and having a similarly square shape is interposed between adjacent ones of the fixed resistance plates 5A with a very small gap therebetween. Each fixed resistance plate 5A has a large transverse length and has a square cutout portion in its center, while each movable resistance plate 6A has a small transverse length and has in its center a cutout portion through which the engaging block 4A is passed through. The fixed resistance plates 5A and the movable resistance plates 6A overlap each other with a fixed width in terms of their phases. The viscous material 7 is filled in the accommodating space K of the container portion 3A to fill the space between the fixed resistance plate 5A and the movable resistance plate 6A, thereby forming the viscous-shear-resistance generating section R.

Rectifying sections 8A in this embodiment are provided on four peripheral sides along the inner walls of the container portion 3A, and are formed by juxtaposing the partition plates 25 having the same configurations as those of the above-described embodiment. The fixed resistance plates 5A are clamped and held by these partition plates 25 in the same way as in the above-described embodiment.

In the operation of this viscous shear-type damper D1, when there occurs a sudden displacement in a free direction, the displacement is divided into an X'-direction component and a Y'-direction component in this damper D1, and the movable resistance plates 6A move due to the resultant of both directional components. Hence, there occurs the viscous-shear resisting force based on the relative displacement between the movable resistance plate 6A and the fixed resistance plate 5A, and the sudden displacement is attenuated.

In this operation, the buildup of the pressure in the viscous material 7 caused by the movement of the engaging block 4A and the movable resistance plates 6A is reduced by the rectifying sections 8A arranged on the four peripheral sides. Consequently, the entrainment of air into the viscous material 7 is prevented, and the expected viscous-shear resisting force is exhibited between the two surfaces of the fixed resistance plate 5A and the movable resistance plate 6A.

The present invention is not limited to the above-described embodiments, and various modifications in the design are possible within the scope of the basic technical concept of the present invention. Namely, the following modes are included in the technical scope of the present invention.

(1) Although in the. above-described two embodiments the so-called hermetically sealed type in which the upper cover 2, 2A closes the opening of the container portion 3, 3A is adopted, it is possible to adopt a mode in which the upper ends of the engaging blocks 4, 4A or opposing upper end portions of the engaging block 4, 4A are integrally coupled to each other by a beam to form a portal-frame shape, in which case the damper becomes an open type.

Figure 9:
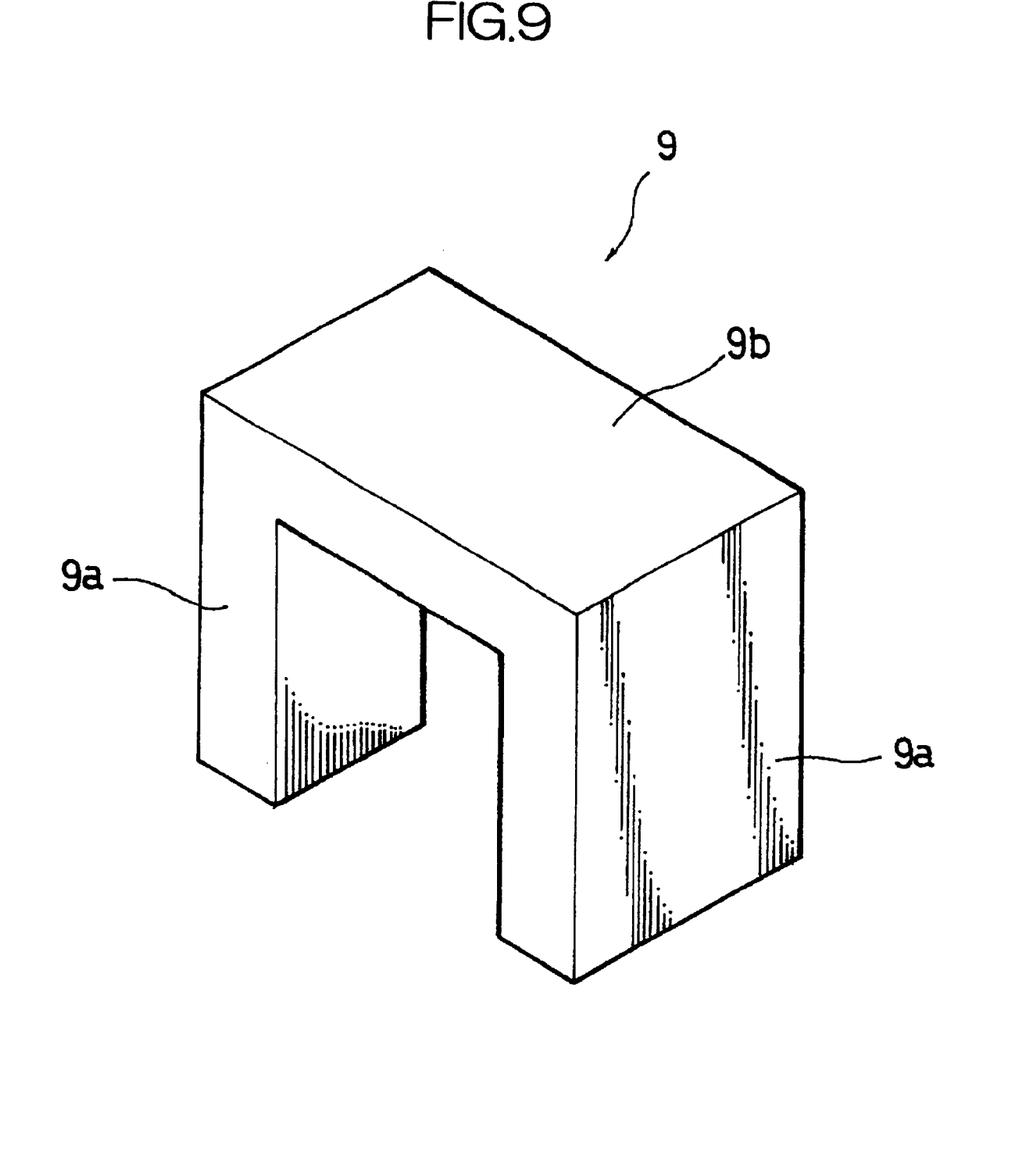
FIG. 9 is a perspective view of an engaging member.

FIG. 9 shows such an engaging member 9 which is comprised of a pair of leg portions 9a and a beam 9b. The leg portions 9a correspond to the engaging blocks 4, and the movable resistance plates 6 are engaged therewith. In this mode, it is possible to adopt two forms, i.e., one in which the leg portions 9a are rested on the bottom of the container portion 3 and another in which the leg portions 9a float. The beam 9b is coupled to the upper structure G.

(2) The stepped portions 23 of the partition plates 25 may be omitted as necessary, in which case the fixed resistance plates 5 are fixed to the partition plates 25 or other members by other appropriate means.

What is claimed is:

1. A viscous shear-type damper comprising:
    a casing including an upper cover horizontally movable relative to a container portion having a rectangular parallelepiped-shaped accommodating space covered by said upper cover;
    an engaging member disposed in the accommodating space and suspended from a lower surface of said upper cover;
    a plurality of movable resistance plates arranged horizontally one above another in the accommodating space of said container portion with fixed intervals therebetween and engaging said engaging member;
    a fixed resistance plate arranged horizontally and interposed between adjacent ones of said movable resistance plates while maintaining a very small gap therewith;
    a viscous material filled in the accommodating space of said container portion to fill the gap between adjacent ones of said movable resistance plates and said fixed resistance plate; and
    a rectifying section disposed at an end portion of said fixed resistance plate to allow said viscous material to flow, said rectifying section including vertical partition plates each extending vertically and disposed between said end portion of said fixed resistance plate and a side wall portion of said casing, each of said vertical plates having a through hole for enabling said viscous material to flow therethrough.

2. The viscous shear-type damper according to claim 1, wherein said partition plates are arrayed at intervals in a horizontal direction.

3. A viscous shear-type damper comprising:
    a casing having a rectangular parallelepiped-shaped accommodating space;
    an engaging member disposed in the accommodating space and including at least a pair of leg portions parallel to wall surfaces defining the accommodating space and a beam spanning upper ends of said leg portions;
    a plurality of movable resistance plates arranged horizontally one above another in the accommodating space while maintaining fixed intervals therebetween and engaging with said leg portions of said engaging member;
    a fixed resistance plate arranged horizontally and interposed between adjacent ones of said movable resistance plates while maintaining a very small gap therewith;
    a viscous material filled in the accommodating space to fill the gap between adjacent ones of said movable resistance plates and said fixed resistance plate; and
    a rectifying section disposed at an end portion of said fixed resistance plate to enable said viscous material to flow, said rectifying section including vertical partition plates each extending vertically and disposed between said end portion of said fixed resistance plate and a side wall portion of said casing, each of said vertical plates having a through hole enabling said viscous material to flow therethrough.

* * * * *